(12) United States Patent
Firat et al.

(10) Patent No.: US 10,263,487 B2
(45) Date of Patent: Apr. 16, 2019

(54) HOUSEHOLD APPLIANCE ELECTRIC MOTOR TERMINAL DIRECT SOCKET CONNECTION STRUCTURE

(71) Applicant: ARCELIK ANONIM SIRKETI, Istanbul (TR)

(72) Inventors: Asuman Firat, Istanbul (TR); Emin Gultekin Sonmez, Istanbul (TR); Pevrul Sarikaya, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 270 days.

(21) Appl. No.: 15/300,238

(22) PCT Filed: Mar. 31, 2014

(86) PCT No.: PCT/EP2014/056461
§ 371 (c)(1),
(2) Date: Sep. 28, 2016

(87) PCT Pub. No.: WO2015/149841
PCT Pub. Date: Oct. 8, 2015

(65) Prior Publication Data
US 2017/0141637 A1    May 18, 2017

(51) Int. Cl.
*H02K 3/52*    (2006.01)
*H01R 4/18*    (2006.01)
(Continued)

(52) U.S. Cl.
CPC ............. *H02K 3/521* (2013.01); *H01R 4/18* (2013.01); *H01R 4/24* (2013.01); *H01R 13/04* (2013.01); *H02K 3/522* (2013.01)

(58) Field of Classification Search
CPC ............. H02K 3/521; H01R 4/18; H01R 4/24
See application file for complete search history.

(56) References Cited

U.S. PATENT DOCUMENTS 3,979,615 A * 9/1976 Neff ..................... H01R 4/2445
                                                              310/71
4,490,004 A * 12/1984 Lawrence ................ H01F 5/04
                                                              439/389
(Continued)

FOREIGN PATENT DOCUMENTS

| EP | 0109141 A2 | 5/1984 |
| EP | 0829944 A2 | 3/1998 |
| EP | 1168576 A1 | 1/2002 |

OTHER PUBLICATIONS

International search report and written opinion, dated Dec. 2, 2014, of corresponding International Application No. PCT/EP2014/056461; 10 pgs.

*Primary Examiner* — Robert W Horn
(74) *Attorney, Agent, or Firm* — Kilpatrick Townsend & Stockton LLP

(57) ABSTRACT

The present invention relates to an electrical household appliance comprising an electric motor with a stator having a core around which a coil is wrapped to be connected to a motor power socket by an electrical connection terminal. An electric motor is disclosed, the electric motor comprising a stator which contains a core wrapped with a coil therearound, an electrical connection terminal into which a mag mate terminal having at least one slit is inserted to be electrically connected to the coil through insertion of the coil into the slit.

12 Claims, 8 Drawing Sheets

Figure 1:
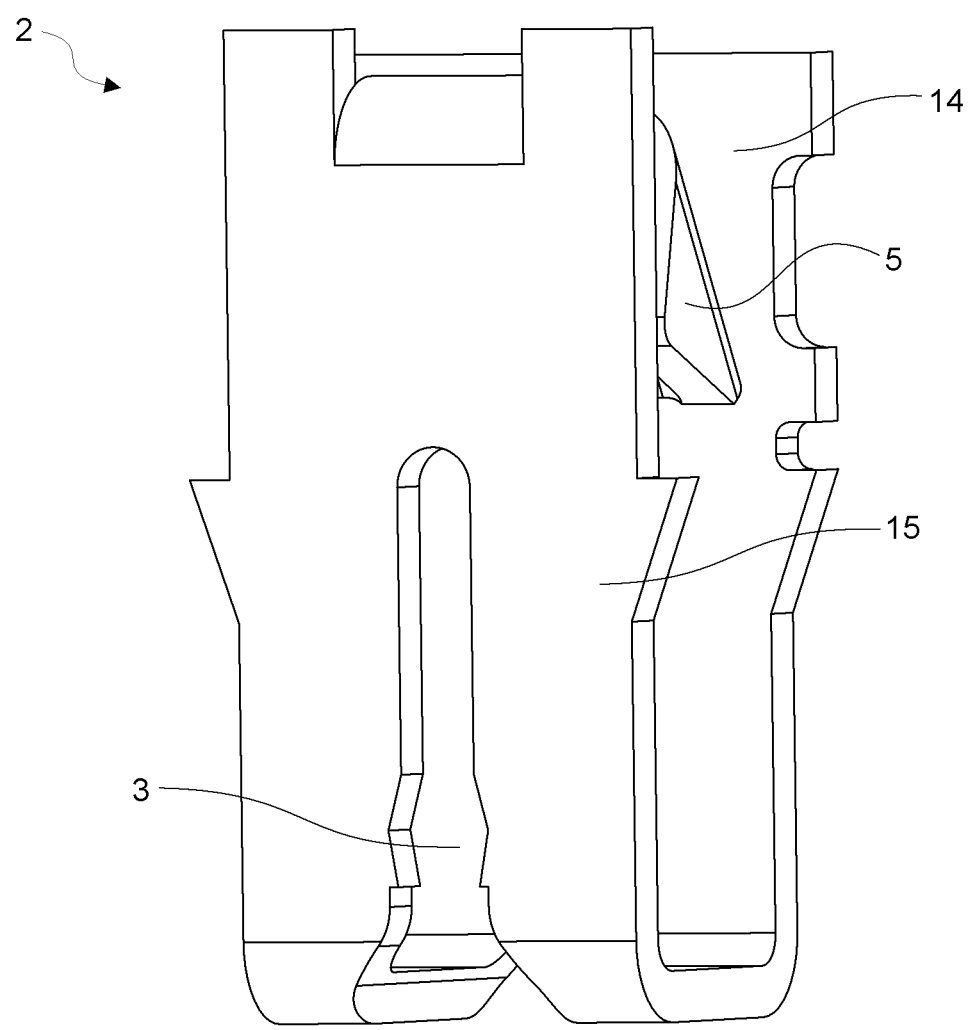

(51) Int. Cl.
*H01R 4/24* (2018.01)
*H01R 13/04* (2006.01)

(56) References Cited

U.S. PATENT DOCUMENTS

| | | | | |
|---|---|---|---|---|
| 5,465,016 A * | 11/1995 | Mancl | H02K 3/522 | 310/249 |
| 5,782,652 A * | 7/1998 | Feher | H01R 4/2462 | 310/71 |
| 5,915,988 A * | 6/1999 | Bitsch | H01R 4/2462 | 310/71 |
| 6,800,973 B2 * | 10/2004 | Futami | H01R 4/2458 | 310/71 |
| 7,906,879 B2 * | 3/2011 | Jang | H02K 3/522 | 310/194 |
| 8,816,542 B2 * | 8/2014 | Kim | H02K 1/18 | 310/194 |
| 9,318,927 B2 * | 4/2016 | Kim | H02K 1/02 | |
| 9,502,940 B2 * | 11/2016 | Yoshida | H02K 3/522 | |
| 2009/0189475 A1 * | 7/2009 | Shin | H02K 3/522 | 310/195 |
| 2010/0156231 A1 * | 6/2010 | Lee | H02K 1/148 | 310/179 |
| 2011/0316365 A1 * | 12/2011 | Kim | H02K 1/18 | 310/43 |
| 2013/0043742 A1 * | 2/2013 | Jang | H02K 3/522 | 310/43 |
| 2014/0015357 A1 * | 1/2014 | Randolph | H01R 4/185 | 310/71 |
| 2015/0123501 A1 * | 5/2015 | Jang | H02K 5/08 | 310/43 |
| 2015/0130328 A1 * | 5/2015 | Jang | G01P 1/026 | 310/68 B |
| 2015/0137635 A1 * | 5/2015 | Firat | H02K 3/522 | 310/71 |
| 2017/0141637 A1 * | 5/2017 | Firat | H02K 3/522 | |
| 2018/0241277 A1 * | 8/2018 | Du | H02K 3/28 | |

* cited by examiner

HOUSEHOLD APPLIANCE ELECTRIC MOTOR TERMINAL DIRECT SOCKET CONNECTION STRUCTURE

RELATED APPLICATIONS

This application is a U.S. National Phase of International Application No. PCT/EP2014/056461, filed Mar. 31, 2014, the entire disclosure of which is incorporated by reference herein.

The present invention relates to an electrical household appliance comprising an electric motor with a stator having a core around which a coil is wrapped to be connected to a motor power socket by means of an electrical connection terminal.

Electric machines rely on the principle of rotating magnetic fields with a magnetic part or rotor. For instance, AC electric motors comprises rotor or a configuration of insulated wire coils in a stationary part, i.e. the stator. Current flow generates magnetic fields in the space of the stator. Stator casings are made from ferromagnetic laminates and longitudinal slots in the stator casing define tooth-like cross sections, i.e. poles.

Electrical machines, such as electric motors or alternators are extensively known to the person in the art. The stator of such machines comprises core slots along which a stator coil is disposed, a plurality of teeth being connected to the stator core by a yoke portion. The cylindrical stator core is provided with a longitudinal hole inside which the rotor is housed. The stator windings are disposed in a plurality of core slots formed by radially extending layers such that straight portions of the windings extend in the slots and end loop sections thereof connect two adjacent straight portions.

The stator core is typically formed to comprise a plurality of laminations of a ferromagnetic material, said laminations being stacked consecutively. A coaxial lamination stack has identical laminations in abutment with one another in the manner that an inner periphery defined by an array of inwardly projecting teeth is formed. In other words, each lamination comprises an annular peripheral portion having a plurality of projections in the form of teeth so as to be extending towards the longitudinal axis of the stator core.

A tap terminal for the power terminal of the motor and a tap terminal for the common terminal of the motor may be provided such that power is supplied to the stator by means of three tap terminals. In this case, the starting and ending parts of the coil may be located respectively on a tap terminal for power terminal and a tap terminal for common terminal.

Among others, one of the prior art disclosures in the technical field of the present invention can be referred to as US 2009189475, which discloses a motor with a stator having a coil wound thereon, a rotor mounted to be rotatable with respect of the stator, a tap terminal positioned at a terminal of the coil, a mag mate terminal placed in the tap terminal for electric connection to a core line of the coil and fastening the coil to the tap terminal, and an insulation portion at the mag mate terminal for forming an insulation coating at an exposed portion of the core line, thereby reducing a production cost and improving productivity and reliability.

The present invention, on the other hand, provides that an electrical connection terminal of an electric motor by which the stator coil is inserted into a mag mate terminal slit is directly connectible with an electrical supply by means of a modified mag mate terminal.

The present invention provides an electric motor with a stator electrical connection terminal which is directly connectible with an electrical supply by means of a modified mag mate terminal, as provided by the characterizing features defined in claim 1.

Primary object of the present invention is therefore to provide an electric motor having no electrical conductor wire in between an electrical connection terminal and an electrical supply socket.

The present invention proposes an electric motor with an electrical connection terminal having at least one slit in which a coil end is introduced and a mag mate terminal being inserted into the electrical connection terminal.

Said mag mate terminal comprises a first wall and a second parallel wall, both of which having slits. The upper part of the mag mate terminal is structured to have a mag mate terminal socket mating end constituting itself a male connector in the form of a plate extension to be coupled with a matched female connector so as to establish electrical connection with the coil.

The socket mating end of the mag mate terminal has a stem portion integral therewith and also in integral connection with the plate extension The stem portion extends out from the first wall of the mag mate terminal and the plate extension being fixedly attached thereto braches out from the center of the linear edge of the stem portion in a planar direction perpendicular to the plane of said stem portion. The plate extension is rotated by 90 degrees with respect to the plane of the stem portion. The longitudinal direction of the coil along which it extends between the slits of the first and second walls lies within the plane in which said plate extension extends.

Accompanying drawings are given solely for the purpose of exemplifying an electric motor whose advantages over prior art were outlined above and will be explained in brief hereinafter.

The drawings are not meant to delimit the scope of protection as identified in the claims nor should they be referred to alone in an effort to interpret the scope identified in said claims without recourse to the technical disclosure in the description of the present invention.

FIG. 1 demonstrates a general perspective view of a conventional mag mate terminal having a slit for the insertion of the coil.

Figure 2:
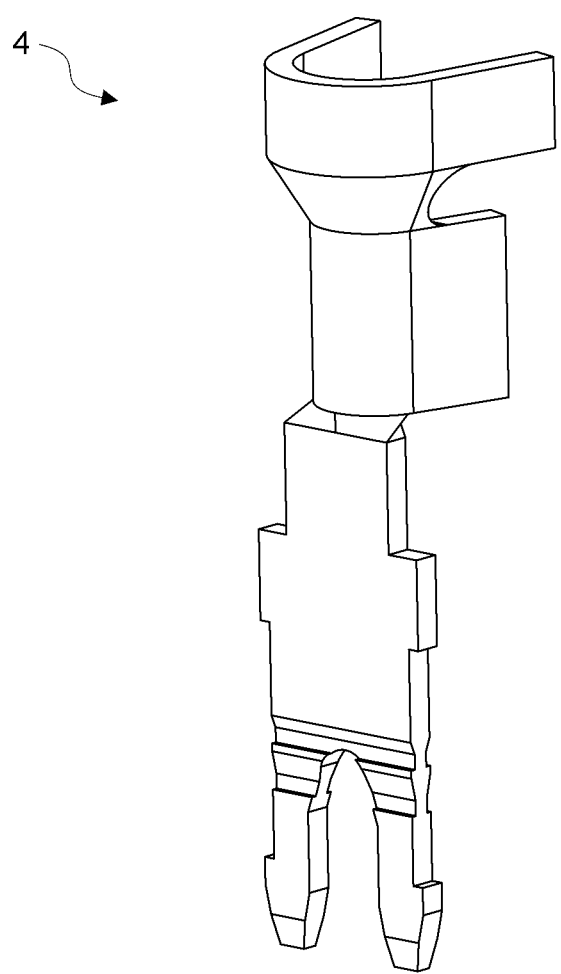

FIG. 2 demonstrates a general perspective view of a conventional male connector interengaging with a mag mate terminal.

Figure 3:
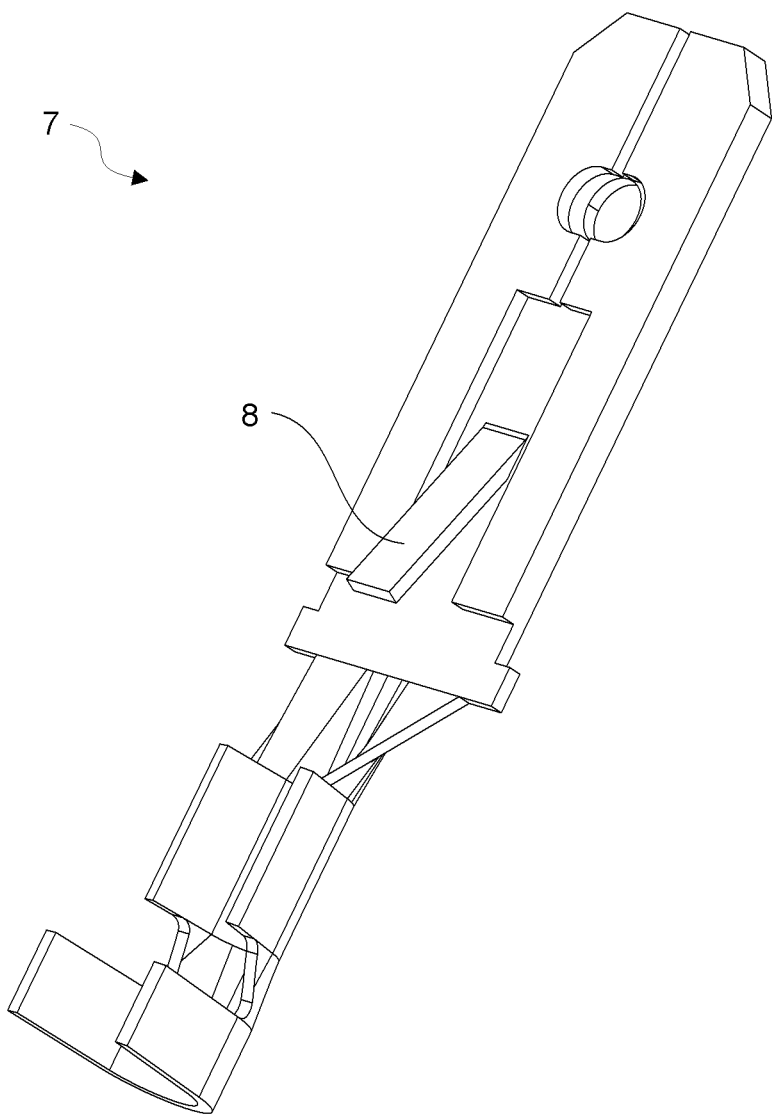

FIG. 3 demonstrates a general perspective view of a socket connector to engage with a motor power socket.

Figure 4:
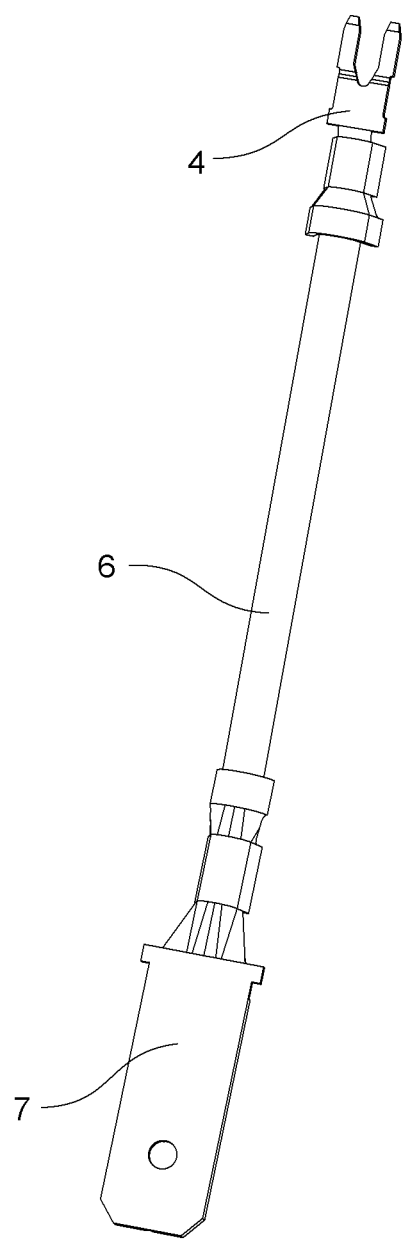

FIG. 4 demonstrates a general perspective view of a multi-core conductor connected by crimping to a male connector and a socket connector at the two ends.

Figure 5:
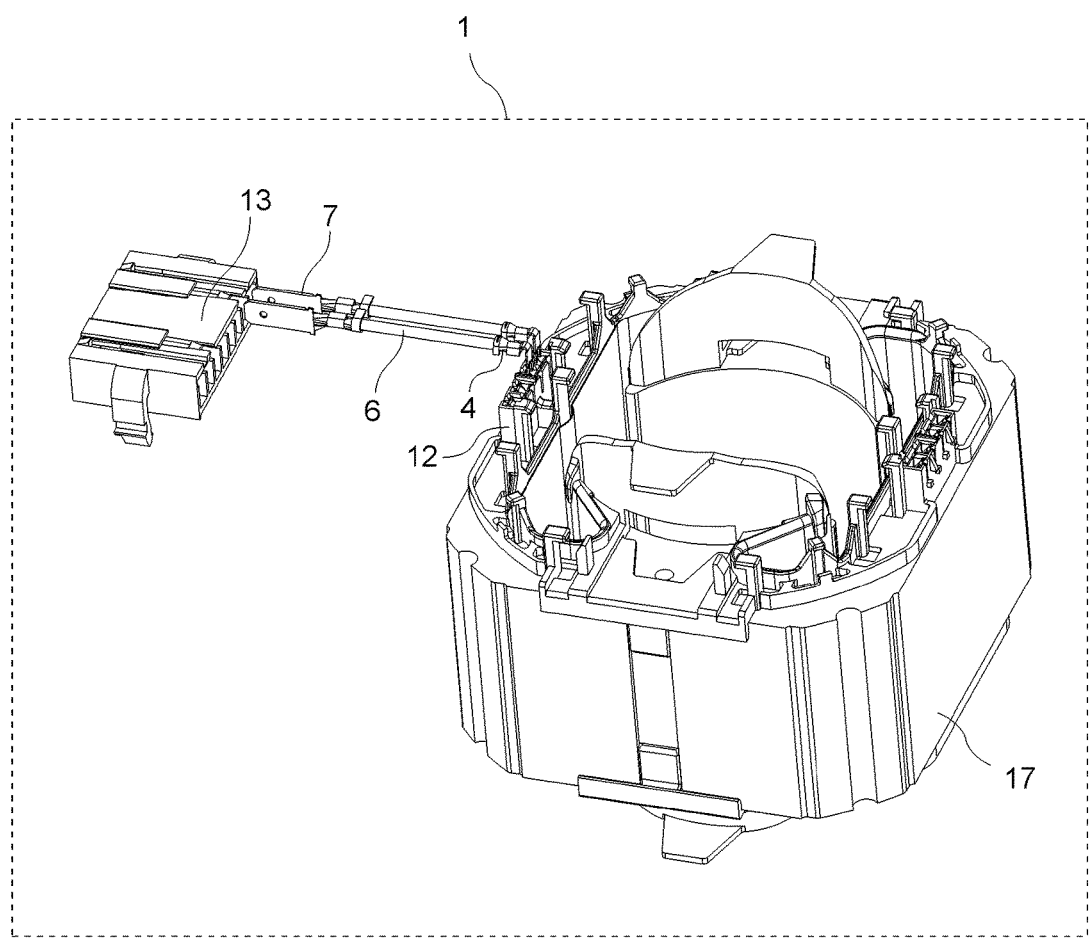

FIG. 5 demonstrates a general perspective view of a multi-core conductor electrically connecting a motor power socket with a mag mate terminal.

Figure 6:
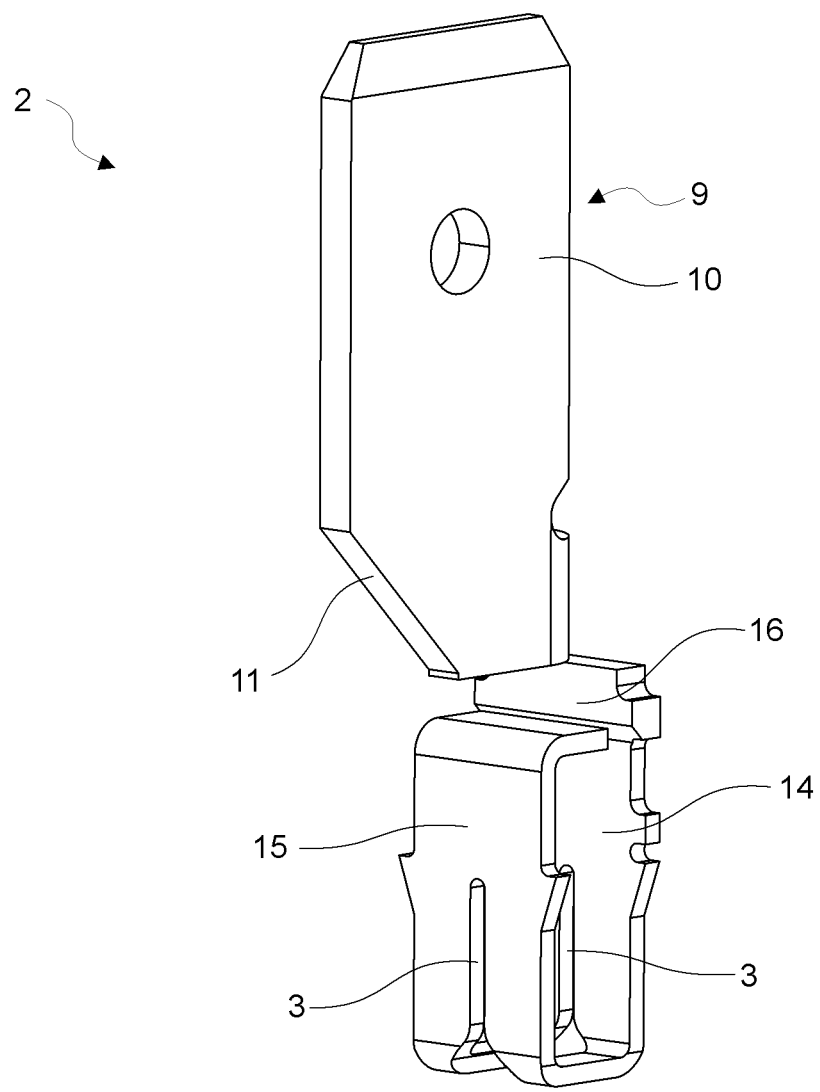

FIG. 6 demonstrates a general perspective view of a mag mate terminal with a plate extension according to the present invention.

Figure 7:
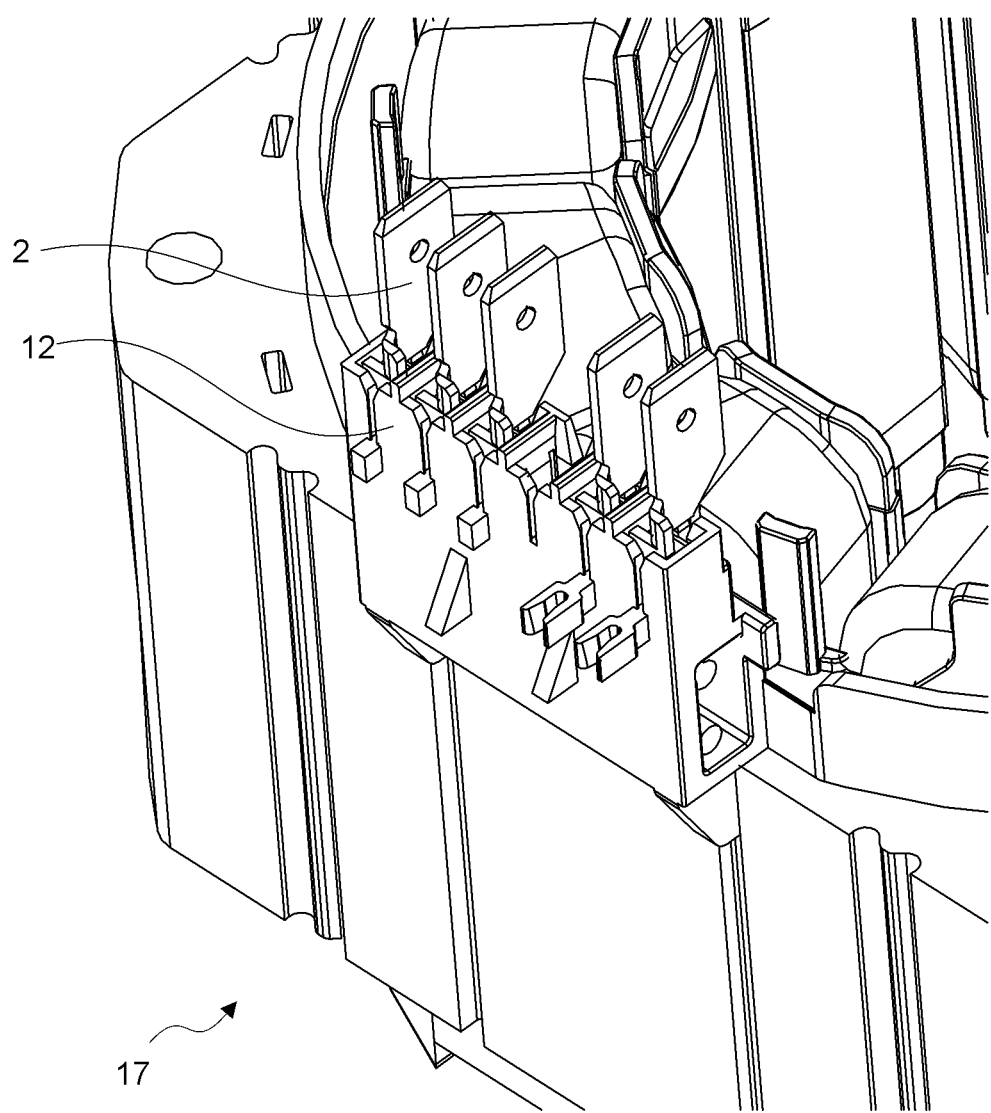

FIG. 7 demonstrates a general perspective view of an electric motor with mag mate terminals having plate extensions according to the present invention.

Figure 8:
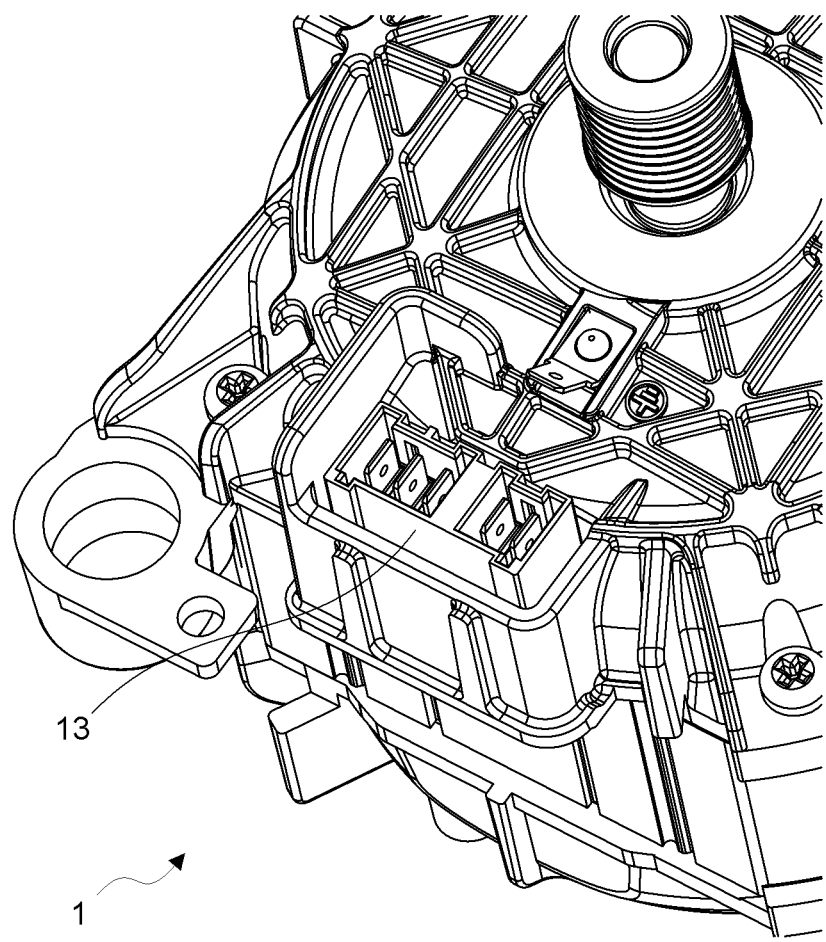

FIG. 8 demonstrates a general perspective view of an electric motor with mag mate terminals in the motor power socket.

The following numerals are used in the detailed description:
1. Electric motor
2. Mag mate terminal
3. Slit
4. Male connector
5. Mag mate terminal locking plate
6. Multi-core conductor
7. Socket connector
8. Socket connector locking plate
9. Socket mating end
10. Plate extension
11. Intermediate edge
12. Electrical connection terminal
13. Motor power socket
14. Mag mate terminal first wall
15. Mag mate terminal second wall
16. Stem portion
17. Stator The present invention proposes an electric motor (1) for an electrical household appliance and particularly for a washing machine, a dishwasher, a drying machine or a combo drying and washing machine. The electrical household appliance comprises an electric motor (1) having a stator (17) and a rotor housed inside a longitudinal stator (17) hole to be rotating relative to the stator (17). The stator (17) core formed of laminations of a ferromagnetic material being stacked consecutively comprises core slots along which a stator (17) coil is disposed, a plurality of teeth being connected to the stator (17) core by a yoke portion. The stator (17) windings are disposed in a plurality of core slots formed by radially extending layers such that straight portions of the windings extend in the slots and end loop sections thereof connect two adjacent straight portions.

An electrical connection terminal (12) for a power terminal or for a common terminal of the electric motor (1) may protrude from an outer surface portion of a stator (17) insulator outwardly in the axial direction of the electric motor (1). A motor power socket (13) is mounted on the motor and is connected to the coil wound on the electric motor (1) to supply power thereto. In this regard, a connector is connected as a medium between the coil and the motor power socket (13), which is referred to as a mag mate terminal (2). The electrical connection terminal (12) of the stator (17) therefore provides electrical connection of the stator (17) with a motor power socket (13), the latter receiving power and supplying it to the stator (17) by means of a mag mate terminal (2).

A mag mate terminal (2) is typically inserted in an electrical connection terminal (12) of the stator (17) such that electrical contact is obtained between the coil and the mag mate terminal (2) by means of at least one slit (3) by the insertion of the extension wire of the coil into said slit (3). A mag mate terminal locking plate (5) of the mag mate terminal (2) provides that the latter is interengaged with a male connector (4) by means of said mag mate terminal locking plate (5). The male connector (4) may be fastened with a multi-core conductor (6) by using any known crimping technique. The other end of the multi-core conductor (6) is also connected by crimping to a socket connector (7) by means of which electrical connection with the motor power socket (13) can be established. A socket connector locking plate (8) ensures that the socket connector (7) remains in electrical connection with the motor power socket (13).

According to the present invention, an electrical connection terminal (12) of an electric motor (1) by which the stator (17) coil is inserted into a mag mate terminal slit (3) is directly connectible with an electrical supply by means of a mag mate terminal (2) having a mag mate socket mating end (9) in the form of a plate extension (10), disposed on one side of an end portion of the mag mate terminal (2) and extending outwardly therefrom, said plate extension (10) having an intermediate edge (11) and terminating with at least one section of reduced width forming at least one end portion adapted to couple with a matched female connector so as to establish electrical connection with the coil.

The socket mating end (9) of the mag mate terminal (2) according to the present invention has a stem portion (16) extending out from a first wall (14) of the parallel walls of the mag mate terminal (2). Said plate extension (10) is integrally formed with the stem portion (16) so as to be extending out from the center of the linear edge of the stem portion (16) in a planar direction perpendicular to the plane of the stem portion (16) and the first wall (14). The plane of the plate extension (10) being rotated by 90 degrees with respect to the plane of the stem portion (16) and the first wall (14) provides that a plurality of neighboring mag mate terminals (2) are placeable paralelly in a neighboring manner with a certain distance in the motor power socket (13) so as to provide a ready-to-connect Rast 5 electrical connector connection. Therefore, the longitudinal direction of the stator (17) coil along which it is inserted into the mag mate terminal (2) slit (3) lies within the plane in which the plate extension (10) extends.

In a nutshell, the present invention proposes an electric motor (1) comprising a stator (17) which contains a core wrapped with a coil therearound, an electrical connection terminal (12) into which a mag mate terminal (2) having at least one slit (3) is inserted to be electrically connected to the coil through insertion of the coil into the at least one slit (3).

The mag mate terminal (2) comprises a mag mate socket mating end (9) constituting a male connector in the form of a plate extension (10), disposed on one side of the mag mate terminal (2) to be extending outwardly therefrom and terminating with at least one end portion adapted to couple with a matched female connector so as to establish electrical connection with the coil. It is therefore ensured that the electrical connection terminal (12) is directly connectible with an electrical supply by means of a modified mag mate terminal (2) such that no electrical conductor wire is present in between the electrical connection terminal (12) and the motor power socket (13).

In an embodiment of the present invention, the mag mate terminal (2) comprises a first wall (14) and a second wall (15) extending parallel to the first wall (14), each wall having a slit (3) extending longitudinally therethrough in a symmetrically opposite manner.

In a further embodiment of the present invention, the socket mating end (9) of the mag mate terminal (2) has a stem portion (16) extending out from the first wall (14) of the mag mate terminal (2) such that the plate extension (10) is spaced apart and electrically insulated from the second wall (15) by an air gap thereinbetween. Said plate extension (10) is integrally formed with the stem portion (16) so as to be extending out from the center of the linear edge thereof in a planar direction perpendicular to the plane of the stem portion (16) and the first wall (14). This configuration provides that an optimal position is provided to each mag mate terminal (2) when a plurality of neighboring mag mate terminals (2) is placed side-by-side with a certain distance in the motor power socket (13).

In a still further embodiment of the present invention, the plane of the plate extension (10) is rotated by 90 degrees with respect to the plane of the stem portion (16) and the first wall (14).

In a yet still further embodiment of the present invention, the longitudinal direction of the coil along which it is inserted into the mag mate terminals' (2) slits (3) lies within the plane in which the plate extension (10) extends.

In a yet still further embodiment of the present invention, the plate extension (10) has an outer end edge with reduced width.

In a yet still further embodiment of the present invention, the plate extension (10) projects through a motor power socket (13) adapted to mate with a female connector carrying power to the motor power socket (13).

According to the present invention, the plate extension (10) directly constitutes itself a male connector projecting through the motor power socket (13) adapted to mate with a female connector carrying power to the motor power socket (13). In this regard, the present invention ensures that a power connection involving no conductor cable is achieved while at the same time substantially reducing manufacturing costs as the number of required parts and components is reduced, therefore improving manufacturing process efficiency.

The invention claimed is:

1. An electric motor comprising:
    a stator comprising a core wrapped with a coil therearound; and
    a first electrical connection terminal into which a second electrical connection terminal having at least one slit is inserted to be electrically connected to the coil through insertion of the coil into the slit, wherein the second electrical connection terminal comprises:
        a first wall and a second wall extending parallel to the first wall, each wall having a slit extending longitudinally therethrough in a symmetrically opposite manner,
        a socket mating end constituting a male connector in the form of a plate extension, the socket mating end being disposed on one side of the second electrical connection terminal to be extending outwardly therefrom and terminating with at least one end portion adapted to couple with a matched female connector so as to establish electrical connection with the coil, wherein the socket mating end has a stem portion that extends out from the first wall such that the plate extension is spaced apart and electrically insulated from the second wall by an air gap therebetween and the plate extension is integrally formed with the stem portion so as to be extending out from the center of a linear edge thereof in a planar direction perpendicular to the plane of the stem portion and the first wall.

2. The electric motor as in claim 1, wherein the plane of the plate extension is rotated by 90 degrees with respect to the plane of the stem portion and the first wall.

3. The electric motor as in claim 1, wherein the longitudinal direction of the coil along which it is inserted into the second electrical connection terminals' slits lies within the plane in which the plate extension extends.

4. The electric motor as in claim 1, wherein the plate extension has an outer end edge with reduced width.

5. The electric motor as in claim 1, wherein the plate extension projects through a motor power socket adapted to mate with a female connector carrying power to the motor power socket.

6. An electric motor comprising:
    a stator which contains a core wrapped with a coil therearound; and
    a first electrical connection terminal into which a second electrical connection terminal having at least one slit is inserted to be electrically connected to the coil through insertion of the coil into the slit, wherein:
        the second electrical connection terminal comprises a socket mating end constituting a male connector in the form of a plate extension disposed on one side of the second electrical connection terminal to be extending outwardly therefrom and terminating with at least one end portion adapted to couple with a matched female connector so as to establish an electrical connection with the coil, and
        the longitudinal direction of the coil along which it is inserted into the second electrical connection terminals' slits lies within the plane in which the plate extension extends.

7. The electric motor as in claim 6, wherein the second electrical connection terminal comprises a first wall and a second wall extending parallel to the first wall, each wall having a slit extending longitudinally therethrough in a symmetrically opposite manner.

8. The electric motor as in claim 7, wherein the socket mating end of the second electrical connection terminal has a stem portion extending out from a first wall of the second electrical connection terminal such that the plate extension is spaced apart and electrically insulated from the second wall by an air gap thereinbetween.

9. The electric motor as in claim 8, wherein the plate extension is integrally formed with the stem portion so as to be extending out from the center of a linear edge thereof in a planar direction perpendicular to the plane of the stem portion and the first wall.

10. The electric motor as in claim 9, wherein the plane of the plate extension is rotated by 90 degrees with respect to the plane of the stem portion and the first wall.

11. The electric motor as in claim 6, wherein the plate extension has an outer end edge with reduced width.

12. The electric motor as in claim 6, wherein the plate extension projects through a motor power socket adapted to mate with a female connector carrying power to the motor power socket.

* * * * *